Oct. 29, 1963   P. H. HOFER ETAL   3,108,851
METHOD OF BIAXIALLY STRETCHING THERMOPLASTIC MATERIAL
Filed Nov. 10, 1958
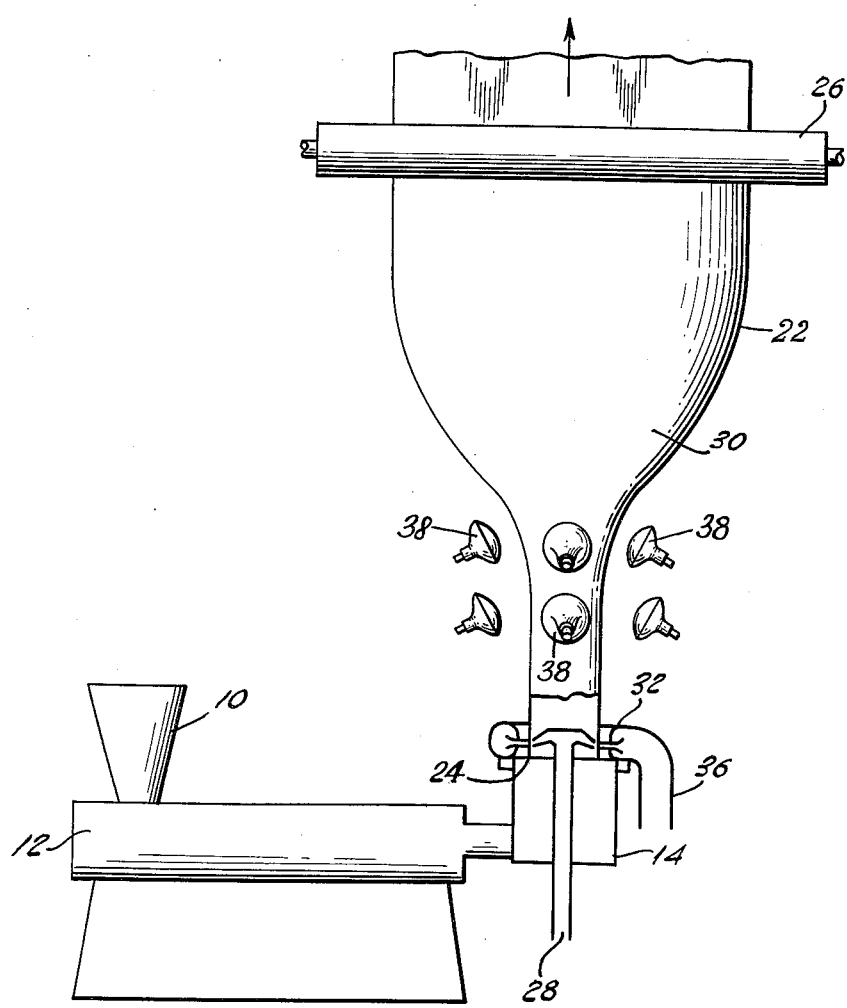
INVENTORS
PETER H. HOFER
WILLIAM T. HIGGINS
BY
James C. Arrantes
ATTORNEY United States Patent Office 3,108,851
Patented Oct. 29, 1963

3,108,851
METHOD OF BIAXIALLY STRETCHING
THERMOPLASTIC MATERIAL
Peter H. Hofer, Berkeley Heights, and William T. Higgins, Roselle, N.J., assignors to Union Carbide Corporation, a corporation of New York
Filed Nov. 10, 1958, Ser. No. 772,746
8 Claims. (Cl. 18—57)

This invention relates to the production of thermoplastic film and tubing. More particularly, this invention relates to a method of biaxially stretching rigid, thermoplastic polymers whereby the polymeric material is molecularly oriented in both the longitudinal and transverse directions.

Rigid polymers, such as polystyrene and styrene-acrylonitrile copolymers, exist in a glassy, brittle state at room temperature wherein the molecules of the polymer are rigidly coiled and intertwined in a random, disordered tangle. When heated, the rigid polymers yield their shape passing from the initial glassy, brittle state into the "rubbery" state wherein their molecular segments, having acquired additional degrees of vibrational and rotational freedom, can be moved and oriented by imposing an appropriate stress thereon. Further increasing the temperature increases molecular energy and decreases material viscosity until the polymer passes through the "rubbery" state into the so-called melt state wherein the polymer molecules slip freely past each other and viscous flow occurs without the application of any stress.

In further explanation of the "rubbery" state of rigid polymers, a rigid polymer, as it is heated, makes a transition from the glassy, brittle state into the "rubbery" state at a temperature commonly referred to as the second order phase transition temperature. At this point, the internal stresses of the polymer are rapidly reduced, high elasticity sets in and the polymer flows like a highly viscous fluid upon application of a stress thereon. Upon application of additional heat, the polymer passes from the "rubbery" state into the so-called "melt" state at a temperature commonly referred to as the first order phase transition temperature.

The first and second order phase transition temperatures of polymers can be conveniently determined by methods described in an article by Fred E. Wiley, "Transition Temperatures and Cubical Expansion," appearing in Industrial and Engineering Chemistry, volume 24, September 1942, at page 1052, which is herewith incorporated by reference.

For a detailed explanation of the "rubbery" state of polymers reference is made to the September 1957 issue of Scientific American which is herewith incorporated by reference, with particular reference to the following articles: "Giant Molecules," by Herman F. Mark, and "The Mechanical Properties of Polymers," by Arthur V. Tobolsky.

The term "rigid polymers" as used herein refers to thermoplastic polymers having a tensile modulus (ASTM–D–882–TC) in excess of about 100,000 p.s.i.

It is known that the mechanical properties of thermoplastic polymers can be substantially improved by uncoiling and straightening the molecules of the polymeric material by a stretching operation while the polymeric material is at a temperature at which molecular orientation can be imparted thereto by a stretching operation, i.e. while the polymeric material is in the so-called "rubbery" state, and thereafter cooling the material whereby the molecules of the polymer are set in the direction or directions in which the stretch was applied.

Thus, it has been proposed to straighten or orient the molecules of thermoplastic polymers by extruding the polymer in the form of a continuous length of tubing at normal extrusion temperatures, i.e. at or above the first order phase transition temperature of the polymer or alternatively stated, within a temperature range wherein the polymeric material is in the so-called "melt" state, collapsing the tubing while cooling to a temperature between the second and first order phase transition temperatures wherein the polymer is in the so-called "rubbery" state, and thereafter introducing and maintaining a gaseous medium under pressure within the interior of the tubing whereby the tubing is biaxially stretched and the molecules thereof oriented.

This method, however, has proved to be entirely unsatisfactory for purposes of stretching and molecularly orienting rigid polymeric material. A tubing of a rigid polymer becomes increasingly brittle upon being cooled and therefore once the tubing is cooled and collapsed, any attempted re-inflation often results in a rupture of the tubing.

It has also been proposed to extrude a thermoplastic polymer in the form of a seamless tubing at normal extrusion temperatures, to then circumferentially impinge jets of a cooling gas upon the exterior periphery of the tubing and to then expand the tubing by introducing and maintaining a gaseous medium under pressure within the tubing.

This method has also proved to be unsatisfactory as circumferentially impinging the exterior of the tubing with a cooling gas produces a temperature gradient between the interior and exterior surfaces of the tubing and leads to non-uniform cooling thereof. Non-uniform cooling of the tubing leads to uneven expansion of the tubing when it is stretched. This results in the production of tubing wherein different sections thereof are of different thickness and have different mechanical properties. Extruding a rigid polymer in the form of tubing at normal extrusion temperatures, cooling the tubing, as for example, by circumferentially impinging the exterior periphery thereof by jets of a cooling gas and thereafter expanding the tubing by introducing and maintaining a gaseous pressure therein under pressure, results in material which is characterized by poor shrinkage, poor cold-crack resistance, low wrinkle strength, low tensile elongation, low tensile strength and low impact strength. Such a tubing is undesirable for obvious reasons and of limited use in commercial applications.

Extruding a rigid polymer in its "rubbery" state and thereafter expanding the tubing has also been found unsatisfactory. In the "rubbery" state the viscosity of the polymer is relatively high. Consequently, extremely high pressures are required to extrude the polymer at these temperatures. Under these conditions of extrusion a uniform, non-distorted, satisfactory quality tubing cannot be produced at a commercially attractive cost.

It is an object of this invention, therefore, to provide a method of biaxially stretching thermoplastic polymers, particularly rigid thermoplastic polymers, to produce molecularly oriented material of improved mechanical properties wherein disadvantages of prior methods are substantially eliminated.

Accordingly, the present invention provides a method of imparting molecular orientation to thermoplastic polymers in both the longitudinal and transverse directions by a multidirectional stretching operation which comprises extruding a thermoplastic polymer in the form of a seamless tubing at normal extrusion temperatures, i.e. above the first order phase transition temperature, withdrawing the extruded tubing from the extruder at a rate greater than the rate of extrusion, cooling the tubing to a temperature below about 20° C. in excess of the second order phase transition temperature and above the second order phase transition temperature thereof while the tubing is maintained substantially at its extruded diameter, reheating the tubing above about 20° C. in excess of the second order phase transition temperature and within a temperature range wherein the polymer can be stretched to effect a molecular orientation of the molecules thereof, i.e. below the first order phase transition temperature and introducing and maintaining a gaseous medium under pressure within the interior of the tubing whereby the reheated section of the tubing is expanded to a diameter greater than its extruded diameter. The tubing is thereafter allowed to cool and set in its expanded or stretched condition whereby the molecules of the tubing are set in their oriented position.

The criticality of cooling the thermoplastic tubing below about 20° C. in excess of the second order phase transition temperature and then reheating the tubing above about 20° C. in excess of the second order phase transition temperature and within a temperature range wherein the tubing can be stretched to effect a molecular orientation of the molecules thereof is clearly shown in the tabulated data of Table I below. The data was obtained by expanding an extruded tubing of a rigid polystyrene polymer of about 2 inches in diameter to a final diameter of 16 inches. Tubing A was expanded in accordance with the present invention. Control I was extruded, cooled and reheated at and to temperatures noted in Table I.

The second order phase transition temperature of the polystyrene was about 82° C.; its molecular weight was about 52,000 as determined by the well-known Staudinger method; and its tensile modulus about 400,000. The temperature of the tubing was determined with an I.C. thermocouple.

TABLE I

|  | Control I | Tubing A |
|---|---|---|
| Extrusion Temperature, ° C | 200 | 200 |
| Temperature to which the tubing was cooled (taken about 0.75 inch above the extrusion die lips), ° C | 115 | 100 |
| Temperature to which tubing was reheated, ° C | 135 | 137 |
| Tensile strength of film in both directions ASTM-D-882-54TC (obtained by slitting tubing), p.s.i. | 9,000 | 11,000 |
| Percent Tensile Elongation of Film in both directions (ASTM-D-882-54TC) | 3 | 7 |
| Cold Crack Temperature in ° C | −40 | <−70 |
| Percent Orientation of Film | 38 | 65 |
| Wrinkle Strength of Film | fair | good |

The data of Table I clearly shows that thermoplastic tubing which is not cooled and reheated according to the present invention, for reasons which are not presently known or understood, is characterized by relatively poor mechanical properties.

Percent orientation was determined by cutting out small squares of the stretched material about 3 inches on a side and heating the squares by immersing them in an inert liquid maintained at about 135° C. for 4 minutes. The material underwent a shrinkage and the percent orientation was calculated from the shrinkage according to the formula:

$$\text{Percent orientation} = \frac{\text{Area before shrinkage minus area after shrinkage}}{\text{Area after shrinkage}}$$

Wrinkle strength was determined by manually crumpling and wrinkling a small sample of the film, about 6 inches on each side, then smoothing the film out and examining it visually for cracks and tears. A film having no cracks and tears is graded as having excellent wrinkle strength. A film having many cracks and tears is graded as having poor wrinkle strength. Films having wrinkle strengths between excellent and poor are graded either fair or good depending on the amount of cracks and tears.

Cold crack temperature in ° C. was determined by looping a 2 inch by 6 inch strip of film back on itself, without creasing it, then administering a controlled hammer blow to the loop to effect a sharp crease in the film. Five film specimens were so tested. The cold crack temperature is the highest temperature at which all five specimens cracked or shattered when so tested.

This invention is particularly advantageous for the production of molecularly oriented film or sheet material from rigid styrene polymers and rigid vinyl polymers. Styrene polymers and copolymers are ordinarily very brittle, but being a long chain type of polymer and containing long molecules, such polymers and copolymers can be greatly strengthened and their brittleness substantially eliminated by application of directional stretching whereby the molecules are oriented in the direction of the stretch application. Although previously it has been difficult to orient styrene polymers and copolymers because of their brittle nature, these difficulties are substantially eliminated by the present invention.

Illustrative of styrene polymers which can be biaxially stretched according to this invention can be mentioned styrene homo-polymers and copolymers produced by reacting styrene with another polymerizable monomer. Also, polymers and copolymers of the homologues and anologues of styrene such as para-chlorostyrene, alpha methyl styrene; the alkyl ring substituted styrenes, such as para ethylstyrene; the vinyl naphthalenes and substituted products thereof. Particularly desirable among the polymerizable monomeric compounds suitable for copolymerization with styrene and styrene homologues and anologues are included the following: acrylic acid esters such as butyl methacrylate, hexyl methacrylate, 2-ethyl hexyl acrylate and the like; nitriles such as acrylonitrile and the like. Illustrative of rigid vinyl polymers are polyvinyl chloride and copolymers thereof such as vinyl chloride-vinyl acetate copolymers.

The method of the present invention, although particularly advantageous for biaxially stretching rigid thermoplastic polymers, can also be used to biaxially stretch thermoplastic polymers in general. Among such thermoplastic polymers can be mentioned the following: cellulose acetate, polyethylene, polypropylene and the like.

The method of the present invention is not restricted to any particular apparatus. For example, the method can be conveniently carried out in an apparatus such as that shown in the accompanying drawing which is an elevational view of a suitable apparatus for carrying out the method of the present invention.

Referring to the accompanying drawing, pellets of a thermoplastic polymer are fed from a hopper 10 into a conventional extruder 12 wherein the plastic material is heated to normal extrusion temperatures, i.e. generally in excess of the first order phase transition temperature. The material is then forced into die head 14 mounted at the outlet end of extruder 12 and extruded as a continuous length of tubing 22 from the annular die orifice 24 of extruder die head 14. The tubing 22 is drawn upwardly away from the die orifice 24 by means of a pair of rotating pinch rolls 26 which also serve to collapse the tubing 22. The rotating pinch rolls 26 are positioned a convenient distance above the die orifice 24 and perpendicular thereto whereby the tubing 22 is drawn upwardly in a vertical direction. It is to be understood, however, that the tubing can be extruded and expanded in a horizontal direction. If desired, a series of collapsing rolls (not shown) can be advantageously positioned around the tubing in order to aid in collapsing the tubing.

The rate of withdrawal of the tubing 22 from the die orifice 24 is greater than the rate of extrusion, generally about 10 times greater than the extrusion rate.

The medium into which tubing 22 is extruded is generally air maintained at room temperature, about 23° C. The medium may be any inert medium maintained at a temperature sufficient to set the tubing 22 to a predetermined final diameter.

The extruded tubing 22 as it is being withdrawn from the die orifice 24 is cooled to a temperature below about 20° C. in excess of the second order phase transition temperature. Cooling of the tubing 22 is conveniently accomplished by passing the tubing through a cooling ring 32, shown in the accompanying drawing, mounted on extrusion die head 14. A cooling agent such as cold air is circulated in the annular passage of cooling ring 32. The coolant is introduced from any convenient source (not shown) into cooling ring 32 by means of feed line 36.

The tubing 22 once cooled to a temperature of below about 20° C. in excess of the second order phase transition temperature but above the second order phase transition temperature thereof is then reheated to a temperature above about 20° C. in excess of the second order phase transition temperature, preferably about 50° C. in excess of the second order phase transition temperature. Reheating the tubing to a temperature of about 50° C. in excess of the second order phase transition temperature thereof and expanding the tubing results in a product which is characterized by highly improved physical properties. The reheating of tubing 22 can be conveniently accomplished by passing the tubing through a heating zone as is shown in the accompanying drawing wherein the heating zone is made up of infra-red lamps 38. Once the extruded tubing 22 is stabilized and reheated to a temperature above about 20° C. in excess of its second order phase transition temperature, preferably about 50° C. in excess of the second order phase transition temperature, the reheated portion of the tubing is expanded by an inert gaseous medium 30 which is generally air maintained at room temperature, i.e. about 23° C. The gaseous medium 30 is introduced within the interior of the tubing 22 located between the rotating pinch rolls 26 and the extrusion die orifice 24 under pressure such that only the reheated portion of the tubing is expanded to a predetermined diameter and the cooled portion of the tubing is maintained substantially at its extruded diameter. The amount of inflating gaseous medium 30 is maintained substantially constant as successive portions of the tubing 22 are withdrawn from the extrusion die orifice 24 by the rotating pinch rolls 26. The gaseous medium 30 rides as a bubble between the rotating pinch rolls 26 and the extrusion die orifice 24 and in effect advances through successive portions of the tubing 22 as the tubing 22 is withdrawn from the extrusion die orifice 24.

The die head 14 is provided with a central orifice 28 which is connected to a gas supply (not shown) whereby the gaseous medium 30 is introduced into the interior of the tubing 22 and expands the reheated portion of the tubing. The gas supply (not shown) is provided with a valve so that when the desired quantity of gas 30 has been introduced into the interior of the tubing, further supply can be cut off and the gaseous medium 30 sealed between the section of the tubing extending between the rotating pinch rolls 26 and the die orifice 24. In the event the quantity of gas decreases, for example by leakage, the requisite amount of gas can be added by proper manipulation of the valve. The inflating gas 30 is preferably air since it is readily and cheaply available. Any gaseous fluid can be used, however, which does not exert any deleterious effect on the extruded tubing.

By adjusting the speed of the rotating pinch rolls 26, and hence the rate of withdrawal of the tubing from the extrusion die orifice 24 and also adjusting the amount of inflating gas 30 within the tubing 22 the diameter and wall thickness of the tubing and therefore the degree of biaxially stretching can be readily and simultaneously controlled.

The variables are adjusted so as to allow proper cooling and heating of the tubing as it emerges from the extrusion die orifice. These variables are also adjusted so that the tubing is not set to that state wherein the reheated portion of the tubing is not further expanded by the gaseous medium located within the tubing until the reheated portion of the tubing is expanded to the desired diameter.

The tubing after it is collapsed on passing through the pinch rolls 26 is slit lengthwise on each edge and unfolded to form two flat films characterized by improved mechanical properties in both the longitudinal and transverse directions, indicating that the material has been molecularly oriented both longitudinally and transversely.

The following examples further illustrate the present invention and are not intended to limit the scope thereof in any manner. Temperatures of the extruded tubings were determined by a standard I.C. thermocouple.

*Example I*

A rigid polystyrene polymer having a tensile modulus of about 400,000, a molecular weight of about 52,000 as determined by the well-known Staudinger method, a second order phase transition temperature of about 82° C. was fed, in the form of pea-sized pellets into an Egan extruder having a bore size of 1¼ inches. The extruder had three heating zones maintained at 260° F., 340° F. and 380° F. respectively. The polystyrene was screw-fed into the extrusion die head and continuously extruded in the form of a seamless tubing at a temperature of about 183° C.

The temperature of the die head of the extruder was maintained at 200° C.

The extruded tubing had an outside diameter of 2 inches and a wall thickness of 20 mils.

The tubing was withdrawn upward in a vertical direction from the extrusion die first through a cooling section comprising a cooling ring having air circulated therein and then through a heating zone comprising a series of 8 variac controlled infra-red heating bulbs (375 watts each) arranged in a circular fashion around the extruded tubing. From the heating zone the extruded tubing was fed into 2 cooperating pinch rolls.

Once the extruded tubing was stabilized, the cooling and heating zones were activated whereby the tubing was cooled to about 100° C. and reheated to about 133° C. The reheated portion of the tubing was expanded by introducing and maintaining air (at room temperature, about 23° C.) under pressure into the interior of the tubing located between the extrusion die orifice and rotating pinch rolls. Enough air pressure was maintained in the interior of the tubing to expand the reheated portion of the tubing approximately eight (8) times the extruded diameter.

The pinch rolls were rotated at a speed such that the tubing was withdrawn from the extrusion die orifice at a rate of about 5 feet per minute. The rate of extrusion of the tubing was about 6 inches per minute.

The biaxially stretched tubing set by the surrounding room atmosphere (temperature of about 23° C.) had a high degree of molecular orientation as indicated by improved mechanical properties in both the longitudinal and transverse directions.

For purposes of comparison "controls" were prepared under the following conditions: Control A, tubing was extruded, expanded and collapsed as described above except that the tubing was cooled to a temperature of about 100° C. and was not reheated. Control B, tubing was extruded and collapsed as described above, but was not cooled, reheated or expanded.

The tabulated data below clearly indicates that film material produced according to this invention has improved mechanical properties.

|  | Oriented Tubing | Control A | Control B |
|---|---|---|---|
| Nature | tough, pliable, good luster | brittle, poor luster | brittle, poor luster |
| Outside Diameter | 15½ inches | 15½ inches | 2 inches |
| Wall Thickness | 0.35–0.5 mil | 0.35–0.5 mil | 20 mils |
| Width of Film (obtained by slitting tubing) | 55 inches | 55 inches | 6 inches |
| Tensile Strength of Film ASTM-D-882-54TC (both directions) | 11,000 p.s.i | 9,000 p.s.i | 7,000 p.s.i |
| Percent Tensile Elongation of Film ASTM-D-882-54TC (both directions) | 10 | 3 | 2 |
| Tensile Impact Strength of Film in ft./lbs./inch | 75 | 20 | 15 |
| Cold Crack Temperature in °C. of Film | –70 | 100 | 100 |
| Wrinkle Strength of Film | excellent | poor | poor |
| Percent Orientation of Film | 70 | 7 | 0 |

*Example II*

A rigid styrene-acrylonitrile copolymer, such as described in Canadian Patent 457,340, containing about 72 percent by weight styrene and about 28 percent by weight acrylonitrile polymerized therein and having a second order phase transition temperature of about 90° C., and a tensile modulus of about 440,000 p.s.i. was extruded, cooled, reheated and collapsed in a manner described in Example I with the following exceptions: the tubing was extruded at a temperature of about 193° C., cooled to a temperature of about 107° C. and reheated to a temperature of about 150° C.

For purposes of comparison controls were prepared under the following conditions: Control C was prepared as described above with the exception that the tubing was cooled to a temperature of about 107° C. and not reheated. Control D was extruded and collapsed in a manner described above, but was not cooled, reheated or expanded.

The tabulated data below clearly indicates that a superior product is produced according to the method of the present invention.

|  | Oriented Tubing | Control C | Control D |
|---|---|---|---|
| Nature | tough, pliable, good luster | brittle, poor luster | brittle, poor luster |
| Outside Diameter | 15½ inches | 15½ inches | 2 inches |
| Wall Thickness | 0.35–0.5 mil | 0.35–0.5 mil | 20 mils |
| Width of Film (obtained by slitting tubing) | 55 inches | 55 inches | 6 inches |
| Tensile Strength of Film ASTM-D-882-54TC (both directions) | 13,000 p.s.i | 8,800 p.s.i | 8,500 p.s.i |
| Percent Tensile Elongation of Film ASTM-D-882-54 TC (both directions) | 15 | 3 | 2 |
| Tensile Impact Strength of Film in ft./lbs./inch | 90 | 30 | 25 |
| Cold Crack temperature in °C. of Film | –70 | 100 | 100 |
| Wrinkle Strength of Film | good | poor | poor |
| Percent Orientation of Film | 70 | 7 | 0 |

*Example III*

A rigid polystyrene polymer having a molecular weight of about 60,000 and a tensile modulus of about 400,000, a second order phase transition temperature of about 82° C. was extruded, cooled, reheated, expanded and collapsed in a manner as described in Example I. Mechanical properties of the biaxially stretched tubing were comparable to the properties of the stretched material of Example I.

Obviously, in the foregoing examples, if one or more of the conditions which were maintained constant, such as the rate of extrusion, the speed of the rotating pinch rolls and the diameter of the extrusion die were varied, the internal gas pressure would have to be balanced in order to compensate for such variations.

The tensile impact strength in the foregoing examples was measured by the procedure described in a pamphlet published by the Bakelite Company entitled Standard Testing Method and designated as WC-69-A/2.

Any convenient cooling and heating means can be employed to cool and reheat the extruded plastic tubing. For example, inert, cooling fluid can be injected within the interior of the tubing or a liquid bath can be used to cool the tubing. A hot box or a liquid bath can be used to reheat the tubing in lieu of infra-red lamps.

Materials such as pigments, fillers, coloring agents, antioxidants, heat decomposition inhibitors and the like, can be added to the thermoplastic polymers in suitable quantities as will be understood by those skilled in the art prior to extruding the plastic material in the form of tubing.

What is claimed is:

1. Method of biaxially stretching thermoplastic material which comprises extruding a thermoplastic material into the form of a tubing, withdrawing said tubing from the point of extrusion at a rate greater than the rate of extrusion, collapsing said tubing at a point spaced from said point of extrusion, and between said point of extrusion and said point of collapsing cooling said tubing to a temperature below about 20° C. in excess of the second order phase transition temperature and above the second order phase transition temperature thereof while said tubing is maintained substantially at its extruded diameter, reheating said tubing above about 20° C. in excess of the second order phase transition temperature and within a temperature range wherein said tubing can be stretched to effect a molecular orientation of the molecules thereof and expanding said reheated tubing to a diameter greater than its extruded diameter.

2. Method as described in claim 1 wherein the tubing is reheated to a temperature of about 50° C. in excess of its second order phase transition temperature.

3. Method as defined in claim 1 wherein the rate of withdrawal of the tubing from the point of extrusion is at least about 10 times the extrusion rate.

4. Method as defined in claim 1 wherein the thermoplastic material is a thermoplastic polymer having a tensile modulus in excess of about 100,000 p.s.i.

5. Method as defined in claim 1 wherein the thermoplastic material is a styrene polymer.

6. Method of bixially stretching thermoplastic material which comprises extruding a thermoplastic polymer, having a tensile modulus in excess of about 100,000 p.s.i. and which is at a temperature above its first order phase transition temperature, into the form of a tubing, withdrawing said tubing from the point of extrusion at a rate greater than the rate of extrusion, collapsing said tubing at a point spaced from said point of extrusion, and between said point of extrusion and said point of collapsing cooling said tubing to a temperature below about 20° C. in excess of the second order phase transition temperature and above the second order phase transition temperature thereof while said tubing is maintained substantially at its extruded diameter, reheating said tubing above about 20° C. in excess of the second order phase transition temperature and below the first order phase transition temperature thereof and expanding said reheated tubing to a diameter greater than its extruded diameter.

7. Method of biaxially stretching thermoplastic material which comprises extruding a thermoplastic polymer, having a tensile modulus in excess of about 100,000 p.s.i. and which is at a temperature above its first order phase transition temperature, into the form of a tubing, withdrawing said tubing from said point of extrusion at a rate greater than the rate of extrusion, collapsing said tubing at a point spaced from said point of extrusion, and between said point of extrusion and said point of collapsing cooling said tubing to a temperature below about 20° C. in excess of the second order phase transition temperature and above the second order phase transition temperature thereof while said tubing is maintained substantially at its extruded diameter, reheating said tubing above about 20° C. in excess of the second order phase transition temperature and below the first order phase transition temperature thereof and expanding said reheated tubing to a diameter greater than its extruded diameter by maintaining a gaseous medium under pressure therein.

8. Method of biaxially stretching thermoplastic material which comprises extruding a thermoplastic polymer, having a tensile modulus in excess of about 100,000 p.s.i. and which is at a temperature above its first order phase transition temperature, in the form of a tubing into a medium maintained at a temperature sufficient to set the tubing to a predetermined final diameter, withdrawing said tubing from said point of extrusion at a rate about 10 times greater than the rate extrusion, collapsing said tubing at a point spaced from said point of extrusion, and between said point of extrusion and said point of collapsing cooling said tubing to a temperature below about 20° C. in excess of the second order phase transition temperature and above the second order phase transition temperature thereof while said tubing is maintained substantially at its extruded diameter, reheating said tubing to a temperature about 50° C. in excess of its second order phase transition temperature and expanding said reheated tubing to a diameter greater than its extruded diameter by maintaining a gaseous medium under pressure therein.

References Cited in the file of this patent

UNITED STATES PATENTS

| | | |
|---|---|---|
| 2,412,187 | Wiley et al. | Dec. 3, 1946 |
| 2,578,899 | Pace | Dec. 18, 1951 |
| 2,851,733 | Pangonis et al. | Sept. 16, 1958 |
| 2,862,234 | Gerber | Dec. 2, 1958 |
| 2,961,711 | Diedrich et al. | Nov. 29, 1960 |

FOREIGN PATENTS

| | | |
|---|---|---|
| 2,961,711 | Great Britain | Nov. 29, 1960 |

OTHER REFERENCES

Bailey: "Stretch Orientation of Polystyrene and Its Interesting Results," from India Rubber World; May 1948; pages 225–231.